PARTY LINE REVERTING CALL BY DIRECTORY NUMBER

Filed Nov. 3, 1948 2 SHEETS—SHEET 1

INVENTOR.
PIER BAKKER
BY
Chas. W. Candy
ATTORNEY

July 1, 1952 P. BAKKER 2,602,120

PARTY LINE REVERTING CALL BY DIRECTORY NUMBER

Filed Nov. 3, 1948 2 SHEETS—SHEET 2

INVENTOR.
PIER BAKKER

BY [signature]

ATTORNEY

Patented July 1, 1952 2,602,120

UNITED STATES PATENT OFFICE 2,602,120

PARTY LINE REVERTING CALL BY DIRECTORY NUMBER

Pier Bakker, Chicago, Ill., assignor to Automatic Electric Laboratories, Inc., Chicago, Ill., a corporation of Delaware Application November 3, 1948, Serial No. 58,066

8 Claims. (Cl. 179—17)

The present invention relates in general to automatic telephone system and has for its principal object the provision of a new and improved switching apparatus of the Strowger step-by-step type for use in making reverting calls to automatic subscribers located on the same party line as the calling party in response to dialing the directory telephone number of the desired called party.

Heretofore in automatic telephone systems, two methods were utilized in making reverting calls. One method being to provide a special reverting call switch which the calling party, knowing the call was a reverting call and that the desired party was on the same party line, dialed by means of a special designated reverting call number. The other method does not provide any reverting call switch and the calling party dials the directory number of the called party thereby utilizing only the regular switch train for extending the call and ringing the desired party. The present invention is directed to improvements in the latter type in which reverting calls are made by directory number.

Heretofore in making reverting calls by directory number, the entire switch train was released and the calling and called parties were feed talking battery from their individual line circuit. Such a line circuit, however, required a three-relay line circuit having a line, a cut-off and a lockout relay, or required special mechanism associated with the line and cut-off relays of a two-relay line circuit. In the present invention a standard two-relay line circuit is used without interlocking mechanism and only part of the automatic switch train comprising the finder and selector is released while the connector switch is maintained in operated position during conversation to feed talking battery to the party line. Accordingly, one of the features of the invention is the provision of an improved Strowger step-by-step connector switch which is operated in accordance with a portion of the digits of the called subscriber's directory number to connect with the called party line, and which, if the called party is on the same party line as the calling party, is arranged to signal the called party when the calling party replaces his receiver, to cause the release of all the switches in the extended connection except the connector switch, to connect a special tone to inform the answering party that the call is a reverting call, and to feed talking battery to the party line during conversation.

Figure 1:
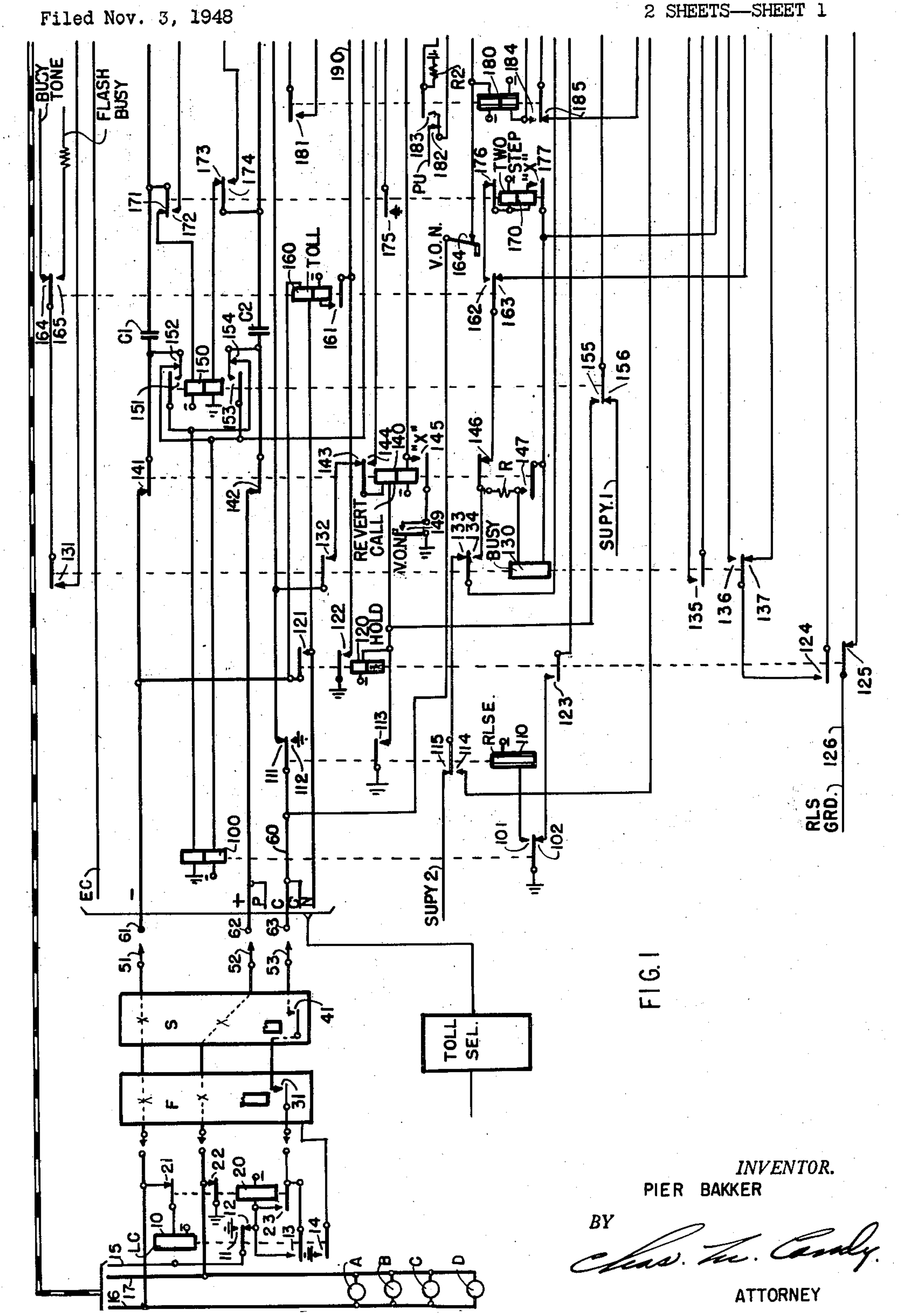

Other objects and features of the invention will be pointed out in the following specification and will best be understood by reference to the accompanying drawings in which Figures 1 and 2 taken together, with Figure 2 to the right of Figure 1, illustrate sufficient details of the automatic telephone system to enable the invention to be described and understood.

Figure 2:
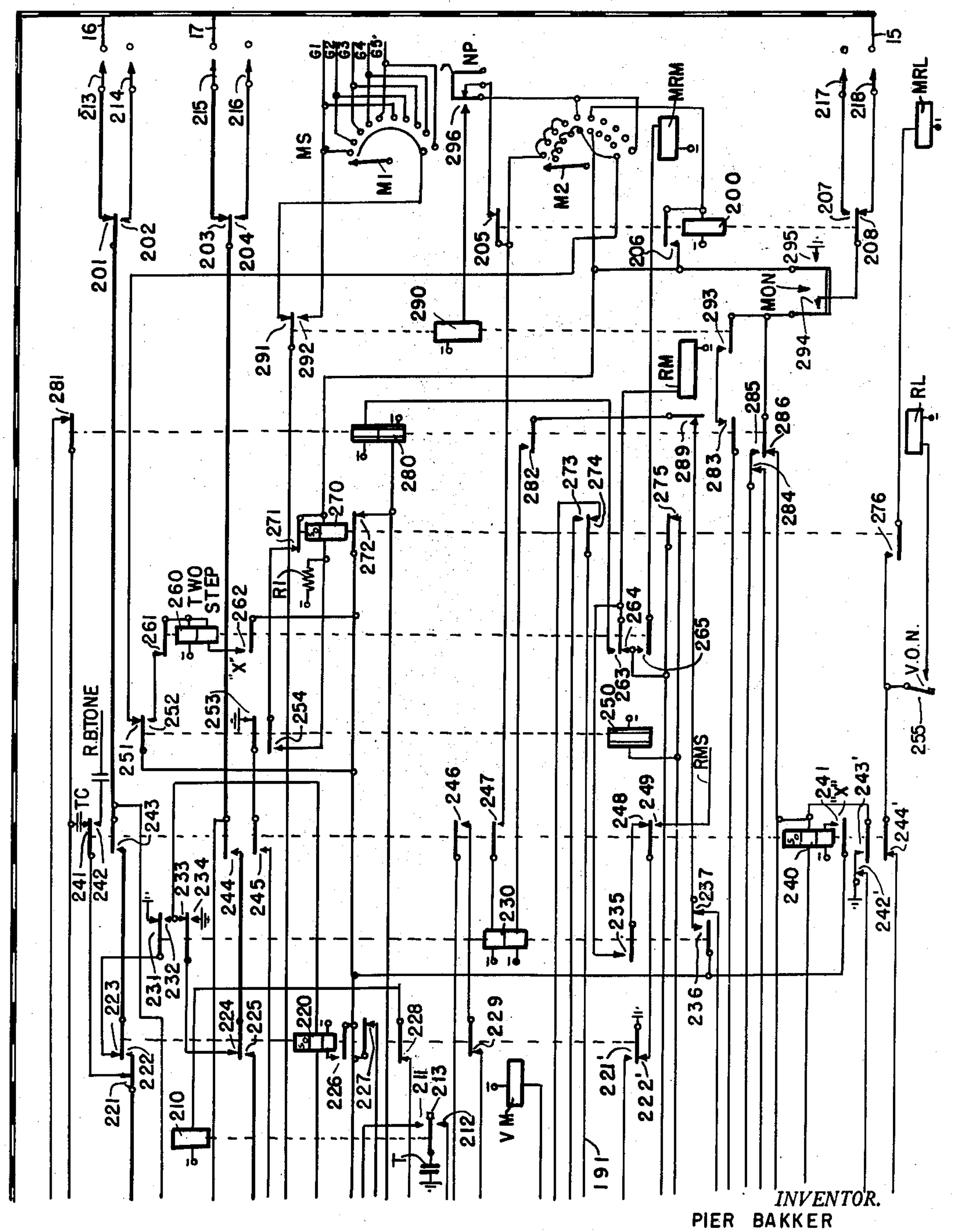

In Figure 1, the party line comprising subscriber substations A, B, C and D terminates in the line circuit LC and in the banks of the connectors, such as illustrated in detail in Figures 1 and 2. Finder-selector links, such as F—S, have access to party lines, such as the line illustrated, through the finder portion of the links while the selectors, such as S, have access to connectors, such as the connector illustrated in detail in Figures 1 and 2. The line current LC, the finder F and the selector S are of the well-known type of Strowger switches used in automatic telephone systems and may be similar to the line circuit, finder and selector shown in the Lomax et al. Patent 2,214,908, issued September 17, 1940. The toll selector also shown in Figure 1 is also of the well-known type of Strowger step-by-step switch and is used by the toll operator to connect with called subscribers through the illustrated connector switch.

The connector switch illustrated in Figures 1 and 2 is also of the well-known Strowger type in which the wipers are raised step-by-step in a vertical direction to select a group of lines and then in a rotary stepping motion to select the line of the desired group. The connector is of the 200 point type having two sets of wipers by means of which the connector has access to 200 lines. A minor switch MS is provided in the connector for selecting the type of ringing to be applied to the called line. The minor switch MS has a stepping magnet for advancing the minor switch wipers, a release magnet for restoring such wipers and off-normal springs MON which are operated when the wipers of the minor switch are moved from normal. The connector also includes a number of relays, the functions of which will be described hereinafter in the detail description.

*Local call*

In response to the calling subscriber A removing his receiver a circuit is completed for operating line relay 10 of LC as follows: ground by way of contacts 22, line conductor 17, through the A substation circuit A, line conductor 16, contacts 21 and winding of line relay 10 to battery. At contacts 11 relay 10 grounds conductor 15 to busy this line to connector switches having access thereto, at contact 13 connects battery through the winding of cut-off relay 20 to the rotary bank contact in the finder bank to mark this line as calling, and at contact 14 connects ground to the finder vertical bank (not shown) and starts a finder of a preselected finder-selector link in the well-known manner. Assuming that the finder-selector link FS is the link taken into use then the wipers of the finder F are operated in a vertical motion to find the calling group as marked by contact 14 and then rotates the wipers in search of the rotary line marking as marked through the winding of cut-off relay 20 and contact 13. When the finder finds the calling line the finder switches through to the associated selector S and cut-off relay 20 is operated. At contacts 21 and 22 the line relay 10 is disconnected and is restored, at contacts 23 a circuit is completed from ground (not shown) in the associated link in the usual manner to maintain relay 20 operated independent of contacts 13. Relay 10, upon restoring, at contacts 11 disconnects ground from conductor 15 but immediately reconnects ground through contacts 12 and 23 to maintain the busy marking, at contacts 13 opens the original energizing circuit of relay 20 and at contacts 14, disconnects the vertical marking from the finder.

When the finder switches through to the selector the calling subscriber receives dial tone in the customary manner and then dials the called subscriber's number. The selector S is operated in response to the first digit dialed to operate the selector in a vertical movement opposite a level of bank contacts corresponding to the digit dialed and thereafter automatically rotates the selector wipers in search of an idle connector switch. Assuming that the connector switch, shown in detail in Figures 1 and 2 is the first idle connector in the selected level, then when the wipers 51 to 53 engage the bank contacts 61 to 63 the selector S switches through and connects the calling line to the connector. Ground from the selector is extended forward over wiper 53, test conductor 60, vertical off-normal springs VON 164, and upper winding of slow-to-release series relay 180 to battery for energizing relay 180. In addition the loop circuit through the calling subscriber's substation, line circuit LC and the finder and selector link is extended over contacts 141—142, 152—154, and the lower and upper windings of connector line relay 100 to battery and ground to energize relay 100.

Relay 180 at contacts 184 prepares a point in the impulsing circuit to the vertical magnet VM. Relay 100 at contacts 101 completes an obvious circuit for energizing slow-to-release release relay 110. Relay 110 at contacts 112 grounds conductor 60 to hold the selector, the finder and the cut-off relay operated and to busy this connector to other switches having access thereto. At contacts 113 relay 110 completes an obvious circuit for energizing slow-to-release hold relay 120. Relay 120 at contacts 122 grounds the hold conductor 190 for energizing relay 280 and for later on holding certain other relays in their operated positions and at contacts 123 prepares another point in the pulsing circuit for the VM magnet. The circuit for energizing relay 280 extends from grounded contacts 122, hold conductor 190, contacts 272 and through the lower winding of slow-to-release relay 280 to battery. Relay 280 performs no useful function at this time.

In response to the calling subscriber dialing the second digit of the called number, line relay 100 is deenergized a number of times corresponding to the digit dialed. Each time relay 100 de-energizes, contacts 101 open the circuit to slow-to-release relay 110 which is maintained in operated condition due to its slow releasing characteristics. The vertical magnet VM is operated once for each de-energization of line relay 100 to step the connector shaft and wipers in a vertical direction over the following circuit: ground at contacts 102, contacts 123, conductor 191, contacts 274, contacts 184 and winding of vertical magnet.

A branch of this circuit extends through the lower winding of series relay 180 to hold this relay in operated position during dialing. In response to the first vertical step of the wipers the vertical off-normal springs 164 open the circuit through the upper winding of relay 180, the vertical off-normal springs 149 close to prepare a locking circuit for the reverting call relay 140 and the vertical off-normal springs 255 close to prepare a circuit for the connector release magnet RL. Shortly after the last impulse of the second digit, series relay 180 restores and at contacts 185 prepares the impulsing circuit to the connector rotary magnet RM.

The calling subscriber now dials the third digit of the called number and the line relay 100 follows these dial pulses. The circuit for operating rotary magnet RM may be traced as follows: ground contacts 102, 123, conductor 191, contacts 274, 185, 264 and through the winding of rotary magnet RM to battery. A branch of this circuit extends by way of contact 275 through the winding of slow-to-release rotary series relay 250 to battery. Relay 250 is operated in this circuit and maintains its contacts closed during the dialing period due to its slow releasing characteristics. At contacts 254 relay 250 completes an obvious short circuit around the winding of relay 270 and at contacts 252 completes the circuit for operating 2 step relay 260 in its first step. This circuit may be traced as follows: from hold conductor 190 grounded at contacts 122, contacts 252 and 261 and through the upper winding of 2 step relay 260 to battery. Two step relay 260 in operating in its first step closes only the X contacts 262 thereby connecting the grounded hold conductor 190 through the lower winding of relay 260. This short circuits the lower winding of two step relay 260 and prevents further operation of this relay.

Shortly after dialing the third digit, slow-to-release relay 250 deenergizes and at contacts 252 removes the short circuit from around the lower winding of two step relay 260, whereupon this relay now energizes through both its lower and upper windings in series to operate its remaining contacts. At contacts 264 relay 260 opens the circuit to the rotary magnet RM and at contacts 265 connects the impulsing circuit to the minor switch rotary magnet MRM.

The calling subscriber now dials the fourth digit to position the minor switch MS. The line relay 100 again follows the transmitted impulses and operates the minor switch rotary magnet one step for each impulse received. The circuit for operating the minor switch rotary magnet MRM may be traced as follows: ground contacts 102, 123, 274, 185, 265 and through the winding of magnet MRM to battery. The series relay 250 is again energized and at contacts 251 removes ground from the multiplied bank contacts accessible to wiper M2 of the minor switch. The minor switch rotary magnet MRM rotates the wipers M1 and M2 one step for each impulse received. In response to the first rotary step of the minor switch, the off-normal springs 294 and 295 are closed. Contacts 295 prepares a circuit for relay 270 which relay, however, has its winding short circuited at contacts 254 as long as relay 250 is operated.

If the fourth digit comprises 5 pulses or less the first set of wipers 213, 215 and 218 are to be used in establishing the connection. In case the fourth digit comprises 6 or more pulses then the second set of wipers 214, 216 and 217 are to be used. When wiper M2 of the minor switch engages its 6th bank contact, a circuit is completed for operating the wiper switching relay 200 as follows: ground through minor switch off-normal contacts 295, the 6th bank contacts engaged by wiper M2 and through the winding of relay 200 to battery. This circuit is completed as soon as the wiper M2 reaches its sixth bank contact and the wiper switching relay 200 is locked energized over contacts 295 and 206. Wiper switching relay 200, upon energizing, switches from the normally connected set of wipers to the normally disconnected set.

Shortly after the last pulse of the fourth digit relay 250 restores and at contacts 254 removes the short circuit from around the winding of relay 270. A circuit may now be traced for operating the slow-to-operate relay 270 as follows: ground contacts 295, winding of relay 270 and through the resistance R1 to battery. At contacts 272, relay 270 opens the circuit to the slow-to-release relay 280 which will restore after an interval. At contacts 276, relay 270 prepares a release circuit for the minor switch release magnet MRL.

The called line is tested before the slow-to-release relay 280 restores. In case the line is busy, a circuit is completed for operating the busy test relay 130 as follows: from busy ground encountered on the test contact of the called line, either wiper 217 or 218 and contacts 207 or 208, dependent upon the operated condition of wiper switch relay 200, and from thence through minor switch off-normal 294, contacts 285, winding of busy relay 130 and through the resistance R to battery. Busy relay 130 energizes over the above traced circuit and at contacts 131 prepares a circuit for connecting busy tone to the calling subscriber, at contacts 132 prepares a point in the circuit for operating the reverting call relay 140, at contacts 133 opens a point in the circuit of relay 250 and at contacts 134 prepares a circuit to the override relay 170, if the toll identification relay 160 is energized or to the reverting call relay if the call is a reverting call. At contacts 135 relay 130 prepares a circuit for the combined ring reversing and stepping relay 230 which is incomplete at contacts 293, at contacts 136 prepares a locking circuit for itself and at contacts 137 opens the circuit to switching relay 240. Relay 280 restores after an interval and at contacts 281 connects the busy tone by way of contacts 164, 131, 281, tone condenser TC and contacts 241 and 221 to the talk conductors of the connector from whence busy tone is transmitted to the calling subscriber in the well known manner. At contacts 282 and 283 opens points in the circuit of relay 230, at contacts 284 closes the locking circuit for busy relay 130 which may be traced as follows: from ground contacts 242', 124, 136, 284 and through the winding of relay 130 and resistance R to battery.

When the calling party hears busy tone and replaces his receiver, line relay 100 restores and at contacts 101 opens the circuit to release relay 110 and at contacts 102 connects ground to the test wiper 217 or 218 for a purpose to be described later on in connection with reverting calls. After an interval slow-to-release release relay 110 restores and at contacts 112 disconnects ground from conductor 60 to release the selector and finder as well as cut-off relay 20 in the well known manner. At contacts 113, relay 110 opens the circuit to the slow-to-release hold relay which now releases unless the call just described is a reverting call. Relay 120, upon releasing, at contacts 122 disconnects ground from the hold conductor 190 to restore the two step relay 260 and at contacts 123 opens a point in the impulsing circuit. At contacts 124, relay 120 opens the locking circuit of busy relay 130 which also releases and at contacts 125 closes the release circuits to the release magnets of both the connector switch and the minor switch as follows: from release ground conductor 126, contacts 125, 244', one branch extending by way of 276 to the minor switch release magnet MRL to battery and the other branch extending by way of vertical off-normal contacts 255 and through the winding of release magnet RL to battery. In response to the operation of release magnet RL, the shaft and wipers of the connector switch are restored to their normal positions in which positions the vertical off-normal springs are also restored to open the circuit to release magnet RL. In response to the operation of the release magnet MRL, the wipers of the minor switch MS are restored to their normal positions and the off-normal contacts 294 and 295 are opened. In response to the opening off-normal contacts 295 relay 200 restores if operated and relay 270 restores and at contacts 276 opens the circuit to release magnet MRL. The connector and minor switch are fully restored and may be used on subsequent connections.

Returning now to the time when the called line was tested for a busy or an idle condition, it will now be assumed that the line was idle instead of busy, and that the test wiper finds negative battery instead of a ground connection with the result that the busy relay 130 is not operated. Now, when relay 280 restores, relay 280 at contacts 286 completes a circuit for energizing the switching relay 240 as follows: from ground contacts 242', 124, 137 upper winding of switch relay 240, contacts 286, 294 and over either contacts 207 or 208 to their test wipers 217 or 218, one of which is in engagement with the test terminal of the idle called line having battery potential connected thereto. Switching relay 240 energizes over this circuit to close its X contacts 241' thereby completing a circuit through its lower winding from grounded hold conductor 190 for fully operating switching relay 240. At contacts 242', relay 240 opens a point in its original energizing circuit after completing the previously described holding circuit through its lower winding to hold conductor 190. At contacts 243', relay 240 grounds the test wiper by way of contacts 286 and 294 to make the called line busy and to operate the cut-off relay in the called subscriber line circuit LC. At contacts 244', relay 240 opens the release circuit extending to the release magnets, at contacts 242 connects a ring-back tone to the calling subscriber, at contacts 243 and 244 prepares the ringing circuits as well as completing points in the talking circuits, at contacts 246 connects the ring pick-up lead PU to relay 180. However, if harmonic ringing is to be used instead of code ringing, the pick-up lead PU is connected to direct ground. At contacts 247, relay 240 prepares a circuit to the ring reversing relay 230, and at contacts 249 starts the ringing machine over conductor RMS in case it is not already started. Relay 180 is energized over the pick-up lead PU from direct ground if harmonic ringing is used, or over the pick-up lead PU when such lead is grounded at the start of the ringing code cycle in the code-ringing machine in the usual manner. The circuit for energizing relay 180 extends over contacts 182, 246 and 229 through the upper winding of relay 180 to battery. At contacts 183 relay 180 closes a locking circuit for itself through ground and resistance R2 after disconnecting the pick-up lead PU at contacts 182, and at contacts 181 completes the ringing circuit. In case party lines are to be code rung then coded generator from the selected generator lead, terminating in the minor switch bank accessible to wiper M1 is sent to the called line. In case the party lines are to be selectively signalled by different frequencies, or by harmonic ringing, then wiper M1 selects the desired frequency lead. In either case the ringing circuit may be traced from the selected generator lead, G1 to G5, bank contacts engaged by wiper M1, contacts 291 and 181, through the upper winding of ring cut-off relay 220, contacts 233 (if the ring reverse relay is unoperated) contacts 224, 244, contacts 203 or 204, wipers 215 or 216, over the called subscriber's substation circuit and ringer to ground for divided ringing, or back over wipers 213 or 214, contacts 201 or 202, contacts 243, 223 and 231 to ground for bridged ringing. In case ring reverser relay 230 is operated then generator is applied in the reverse manner over contacts 232 and back to grounded contacts 234. The ring reverse relay 200 is operated over wiper M2 and contacts 247 from grounded conductor 190 in case the ringing digit for operating the minor switch is five or less.

When the called party answers ring cut-off relay 220 operates over the above traced ringing circuit. At contacts 226, relay 220 completes a locking circuit to grounded hold conductor 190 through its lower winding, at contacts 229 opens the circuit to relay 180 which releases after an interval, at contacts 223 and 224 disconnects the ringing circuit and at contacts 222 and 225 completes the talking circuit to the back bridge relay 150. The circuit for energizing back bridge relay 150 may be traced as follows: from ground lower winding of relay 150, contacts 173, 225, 244, 203, wiper 215 over the talking conductors of the called subscriber's line back to wiper 213, contacts 201, 243, 22, 171 and through the upper winding of back bridge relay 150 to battery. At contacts 155 completes a circuit for holding relay 120 energized independent of contacts 113. At contacts 151 to 154, reverses the battery connections to the calling line for metering or supervisory purposes. Relay 150 feeds talking battery to the called line and relay 100 feeds talking battery to the calling line. The talking circuit includes the heavy talking conductors as shown on the drawings.

After conversation and in response to the called party hanging up, back bridge relay 150 deenergizes and reverses battery back to normal at contacts 151 to 154 inclusive. At contacts 156, relay 150 connects ground from contacts 221' to supervisory lead SUPY-1 for indicating when the call is held by the calling party. At contacts 155, relay 150 opens one of the circuits maintaining the hold relay 120 in energized position.

When the calling party replaces his receiver, line relay 100 restores and at contacts 101 opens the circuit to slow-to-release relay 110. After an interval release relay 110 restores and at contacts 112 disconnects ground from conductor 60 to thereby cause the release of the selector S and finder F and the cut-off relay 20 in the well known manner. At contacts 113, relay 110 opens the circuit to relay 120 which restores after an interval. Relay 120, upon releasing, at contacts 122 disconnects ground from hold conductor 190 to release the ring cut-off relay 220, two step relay 260 and switching relay 240. At contacts 243', relay 240 disconnects ground from the test wiper to remove the busy condition from the called line and at contacts 244' completes the previously traced circuits for the connector release magnet RL and the minor switch release magnet MRL. These release magnets restore the connector and minor switches to normal in the same manner as previously described. When the connector and minor switches are restored their off-normal contacts open to restore relays 200 and 270.

In case the calling party releases first, line relay 100 restores followed by relay 110, and in this case a circuit may be completed from contacts 102, 123, 273, 133, and 115 to the supervisory lead SUPY-2 for indicating to the attendant that this switch is held by the called party. The connector switch is maintained busy from grounded contacts 253, 245 and 111 until the called subscriber replaces his receiver. When the called party hangs up, back bridge relay 150 deenergizes and at contacts 155 opens the circuit to hold relay 120. After an interval, relay 120 restores and opens circuits to relays 260, 240 and 220 as previously described. The release of switching relay 240 again completes the circuit to the release magnets of the connector and minor switches to restore these switches to their normal positions.

*PBX hunting*

In case the directory number of a group of private branch exchange (PBX) trunks is called and the first trunk in this group is busy, the switch hunts for an idle trunk in this group. On calls to the PBX trunk groups the normal post springs NP, Figure 2, are operated on a specific connector level in response to the vertical operation of the connector switch to prepare a circuit to the PBX relay 290. PBX hunting is obtained by dialing "5" as the last digit for a trunk in the first 100 line group and, if PBX hunting in the second 100 line group is desired for another PBX group, the last digit dialed is "0". The normal post springs NP are operated in response to the vertical operation of the connector after which the connector is rotated in accordance with the rotary digit dialed to the connector. In case the last digit dialed was digit "5" and when relay 250 restores shortly after the last pulse, said relay at contacts 251 completes the circuit for operating the PBX relay 290 as follows: from grounded hold conductor 190, contacts 251, fifth bank contacts engaged by wiper M2, operated normal post contacts 296 and through the winding of relay 290 to battery. A similar circuit may also be traced for relay 290 including the tenth bank contacts and wiper M2 in case the last digit dialed was "0." In dialing the last digit "0" the wiper M2 momentarily rests on its sixth bank contacts to complete the previously traced circuit for wiper switching relay 200 which operates and locks.

If the PBX trunk line, upon which the connector wipers are resting, is busy, the connector test wiper will be grounded with the result that busy relay 130 is energized over the previously traced circuit before relay 280 restores. At contacts 135, busy relay 130 completes a circuit from the test wiper to relay 230 as follows: from grounded test wiper 218, contacts 208, 294, 293, 283, 135, 237, 289 and 282 and through the lower winding of relay 230 to battery. In this instance, the ring reverse relay 230 is to be used as a stepping relay for automatic rotation of the wipers. At contacts 236, relay 230 completes a locking circuit for itself from grounded hold conductor 190, contacts 236, 289 and 282 through its lower winding. At contacts 235, relay 230 completes the circuit for maintaining relay 280 in operated position, from ground, contacts 222', 248, 235, 263 and through the upper winding of relay 280 to battery. Rotary magnet RM is also operated in the following circuit to step the connector wipers an additional rotary step; ground, contacts 222', 248, 235 and through winding of rotary magnet RM to battery. Near the end of its stroke, rotary magnet RM opens contacts 289 to open the circuit to relay 230 which thereupon restores. At contacts 235, relay 230 opens the circuits to the rotary magnet RM and relay 280 with the result that the rotary magnet RM restores to close contacts 289. The wipers have now been operated into engagement with the terminals of the next PBX trunk and if the second trunk is busy ground potential on the test contact thereof holds the busy relay 130 in operated position with the result that relay 230 is again operated to again cause the connector wipers to take another step. When an idle PBX trunk is found, busy relay 130 releases and after an interval, slow-to-release relay 280 likewise releases. When relay 280 restores the switching relay 240 is operated in the same manner as previously described to switch the call through to this idle PBX line.

If all of the PBX trunks are busy, the wipers of the connector will step to the last contact in the group where the test wiper will encounter a ground through a 500 ohm resistance. Relay 230 is marginal with respect to this ground connection through the 500 ohm resistance and will not operate. Busy relay 130, however, remains operated through this 500 ohm resistance and ground to send the busy signal back to the calling subscriber.

PBX hunting in the second 100 group takes place in the same manner as just described except that digit "0," instead of the digit "5," is dialed. In this case the wiper switching relay 200 is operated and locked during the momentary closure of its circuit in position six of the minor switch. The operation of relay 200 switches wiper sets to permit PBX hunting in the second 100 group, the operation is the same as previously described except that wiper 217 is used instead of test wiper 218.

When an idle line is found, busy relay 130 restores, relay 280 restores and relay 240 operates. Relay 130 at contacts 137 prepares a point in the circuit of switching relay 240 and relay 280 at contacts 286 completes the circuit for operating switching relay 240 as follows: ground contacts 242', contacts 124, 137, upper winding of switching relay 240, contacts 286, 294, 207, connector test wiper 217 and over the test conductor of the called PBX line through the winding of the PBX cut-off relay to battery. After operation of the switching relay 240, the switch operates in the same manner as previously described, for a local call. This PBX operation is substantially the same as that disclosed in my copending application Ser. No. 770,085, filed August 22, 1947, now Patent No. 2,542,272, granted February 20, 1951.

Night service to these PBX lines are provided by dialing either digit "1" or "6," as the last digit on the minor switch dependent upon the 100 group desired. In this case the PBX relay 290 is not operated and therefore the contacts 293 are not closed to provide automatic rotation with the result that if the particular called night line is busy, then busy tone will be transmitted back to the calling party.

*Toll call*

An incoming toll call from an operator's position comes in over the toll selector TOLL SELECTOR Figure 1, and such selector seizes the connector illustrated if idle. In response to this seizure ground is fed forward from the toll selector over lead C', conductor 60, VON 164 and through the upper winding of relay 180 to battery to energize this relay to prepare the circuit to the vertical magnet VM. A loop circuit is closed across conductors P and N for operating line relay 100 and toll relay 160 in series. This circuit may be traced as follows: ground upper winding relay 100, contacts 154, 142, P conductor over the closed loop in the toll switch train, back to N conductor, upper winding of relay 160, contacts 141, 152 and through the lower winding of relay 100 to battery. Toll relay 160 at contacts 161 completes a locking circuit through its lower winding to grounded hold conductor 190, which is grounded as a result of the operation of relays 100, 110 and 120. At contacts 162 relay 160 prepares a point in the circuit for two-step override relay 170. The operation of line relay 100 causes the operations of relays 110 and 120 as previously described. Relay 120 at contacts 121 closes a short-circuit around the upper winding of toll relay 160 but this relay remains operated over its lower winding. Relay 160 at contacts 165 prepares a circuit for transmitting flash busy to the toll operator instead of busy tone if the called local line is busy.

The toll operator may now dial the remaining digits of called subscriber's number whereupon relay 100 follows the dial pulses to operate the connector in the same manner as previously described.

If the called line is busy relay 130 is operated in the same manner as previously described and when relay 280 releases flash busy is connected back to the operator through contacts 165, 131, 281 and over the EC lead to the toll switch train. The toll operator may release the connection if desired or may cut in on the busy called line to verify the busy condition. In order to cut in on the busy called line, the toll operator now dials the digit "1" to cause the restoration and reenergization of line relay 100. Relay 100, in restoring, completes the following circuit for operating two-step over ride relay 170 in its first step: ground contacts 102, 123, 274, 134, 146, 162, 176 and upper winding of relay 170 to battery. In its first step relay 170 closes only its X contacts 177 thereby closing a short circuit around its lower winding from ground at contacts 242'. When the line relay reenergizes after the single pulse, the short circuit is removed from the lower winding of relay 170 to fully operate relay 170 in its second step as follows: ground contacts 242′, 124, 136, 284, and 177 and through both windings of relay 170 in series to battery.

At contacts 172 and 174 relay 170 completes a monitoring circuit to the wipers 213 and 215 in engagement with its multipled bank contacts terminating the called line in order to converse with the called subscriber. At contacts 175 relay 170 operates relay 280 over its lower winding and at contacts 176 opens its original energizing circuit.

Relay 280, upon energizing, at contacts 281 opens the busy flash circuit and at contacts 284 and 285 transfers the holding circuits for relays 130 and 170 to test wiper 218 in engagement with the grounded test terminal of the called line. The circuit for holding relays 130 and 170 operated extends from the grounded test terminal of the busy called line, wiper 218, contacts 208, 294, 285 and through the windings of relays 130 and 170 to battery.

The operator may converse with the called party and may ask the called party to hang up. When the called party hangs up and the local switch train is released, ground is removed from the test terminal of the called line to release relays 130 and 170. Relay 170 at contacts 172 and 174 opens the monitoring circuit and at contacts 175 releases relay 280. Since the called line is now idle, battery potential through the winding of the called subscriber's cut-off relay is connected to the test terminal engaged by wiper 218 to energize switching relay 240 over the following circuit: ground contacts 242′, 124, 137, upper winding of relay 240, contacts 286, 294 and 208 to wiper 218. The called line is now seized and rung in the same manner as previously described when switching relay 240 operates. After conversation, the release of the connection is the same as for a local call, the relay 160 releasing in response to the removal of ground from hold conductor 190.

*Reverting calls*

A reverting call to another party on the same line as the calling party, is made by dialing the directory number of the called party. In response to dialing the last three digits of the called party's directory number, the connector switch operates in the same manner as previously described for a local call to connect with the called line and to select the ringing frequency, or code, of the called party. In this case the calling party is on the same line as the called party with the result that the called line tests busy and busy relay 130 is operated as previously described. Relay 280 restores and connects busy tone to the calling party who then replaces his receiver. Line relay 100 restores and opens the circuit to relay 110 which also restores. Relay 100, upon restoring, completes the following circuit for operating the reverting call relay 140 in series with the hold relay 120 because the called party is on the same line as the calling party: from ground contacts 102, 123, 273, 134, 146, 163, 286, 294, 208, wiper 218 in engagement with the test terminal of the called line, conductor 15, contacts 12, 23, test terminal and test wiper of the finder F, contacts 31, 41 selector wiper 53 and test terminal 63, conductor 60, contacts 111, 132 and 143, upper winding of reverting call relay 140, and winding of hold relay 120 to battery. Hold relay 120 is maintained operated over this reverting call circuit when relay 110 releases to prevent the release of the connector. Reverting call relay 140 first closes its X contacts 145 to lock itself to vertical off-normal contacts 149 over its lower winding before opening its original energizing circuit at contacts 143. At contacts 141 and 142 relay 140 opens points in the circuit to relay 100 and at contacts 144 completes another circuit for holding relays 120 and 140 operated as follows: ground contacts 122, 227, 144, upper winding of relay 140, and winding of relay 120 to battery. At contacts 145 relay 140 closes a circuit for operating relay 210 as follows: ground vertical off-normal contacts 149, contacts 145, 228 and through the winding of relay 210 to battery. At contacts 146 relay 140 opens a point in its original energizing circuit and removes ground from test wiper 218 and at contacts 147 closes an obvious short circuit around the winding of busy relay 130 to cause its release. When ground is removed from test wiper 218 and test conductor 15 by the operation of contacts 146 the cut-off relay 20, the finder F and the selector S restore. Relay 210 at contacts 211 charges condenser T through the lower winding of relay 100.

Relay 130, being short circuited at contacts 147, releases slowly to permit the finder and selector to restore and after an interval opens the busy tone at contacts 131 and at contacts 137 completes the circuit for switching relay 240. The circuit for operating relay 240 extends from ground, contacts 242′, 124, 137, upper winding of relay 240, contacts 286, 294, 208, wiper 218, conductor 15, contacts 12, and through the winding of cut-off relay 20 to battery. Relay 240 operates and locks as previously described and closes direct ground at contacts 243′ to operate cut-off relay 20 over a portion of the previously traced circuit. At contacts 246 relay 240 closes a circuit through the upper winding of relay 180 and at contacts 245 connects ground at contacts 253 by way of contacts 111 to conductor 60 to busy the connector.

At contacts 181 relay 180 completes the ringing circuit as previously described and when either the calling or called party removes his receiver the ring cut-off relay 220 is operated as before. Relay 220 locks itself to grounded hold conductor 190 at contacts 226 and closes the circuit to back bridge relay 150 at contacts 222 and 225. At contacts 227 relay 220 opens the circuit through the upper winding of reverting call relay 140 and hold relay 120 but relay 140 is held operated over its lower winding and relay 120 is maintained operated over a circuit to be described later. At contacts 228 relay 220 opens the circuit of relay 210 and at contacts 229 opens the circuit of relay 180. Relays 210 and 180 restore.

Back bridge relay 150 energizes in response to the operation of ring cut-off relay 220 over the following circuit: ground and battery through the lower and upper windings of relay 150, contacts 171 and 173, 222 and 225, 243 and 244, 201 and 203, wipers 213 and 215, conductors 16 and 17 and through the loop at the answering substation. At contact 155 relay 150 closes a holding circuit from grounded contact 221′ for maintaining hold relay 120 energized.

When relay 210 restores the vibrating weighted reed 213 vibrates between contacts 212 and 211 to alternately discharge and charge condenser T thereby producing a tone which is transmitted over the heavy talking conductors and wipers to the called line to notify the called party that a reverting call is being made.

Depending upon the type of ringing employed, the calling party may or may not hear the called party being rung. If the ringing can be heard, the calling party will answer after it ceases, and if it cannot be heard, the calling party will answer after a sufficient length of time has passed.

After the calling party answers to complete the call, talking battery is furnished to both parties from the windings of relay 150.

If the called party fails to answer, ringing will continue until the calling party answers. When the calling party answers ring cut-off relay 220 is operated as before to open the ringing circuit and to operate relay 150.

After conversation and in response to both the calling and called parties hanging up their receivers relay 150 restores. At contacts 155 relay 150 opens the circuit to hold relay 120 which restores after an interval to disconnect ground from hold conductor 190 to release relays 220, 240 and 260. At contacts 125, relay 120 completes the previously traced circuits for operating the release magnets RL and MRL to restore the switches to normal. Off-normal contacts 149 open when the connector shaft and wipers are restored to release reverting call relay 140 and off normal contacts 295 release relay 270 and relay 200 if operated. The connector is now fully restored and may be used on subsequent calls.

From the foregoing it will therefor be seen that I have provided a connector switch which is operated in accordance with the telephone directory number of the called party line subscriber in making reverting calls, which permits the release of all preceding switches except the connector when the calling party hangs up and which connector is held in operated position during conversation to feed talking battery to both the calling and called parties, and then released after conversation when both parties hang up their receivers.

What is claimed is:

1. In a telephone system, party lines, a plurality of stations on each party line, a connector switch having access to said lines, means controlled by a calling station on one of said lines for directively operating said connector switch to connect with said one line and to selectively signal any selected one of said plurality of stations on said one line in making a reverting call, a reverting call tone relay included in said connector switch, said reverting call tone relay having a vibrating reed which alternately charges a condenser and then discharges said condenser over said one line, means actuating said tone relay in response to said selected station answering to discharge said condenser over said line to signal the called subscriber that a reverting call has been answered.

2. In a telephone system, a party line having calling and called terminals, a connector switch having access to said called terminals, other switches operated by a calling station on said line for extending a connection from the calling terminals of said line to said connector switch, means for operating said connector switch to select the called terminals of said line, means for transmitting a busy tone to the calling station in case the called station is on the same line as the calling station, means responsive to the calling station replacing his receiver for releasing said other switches to disconnect said other switches from said line, for operating said connector switch to seize said selected called terminals of said line and to automatically signal said called station on said line, means in said connector switch for feeding talking battery over said called terminals on a reverting call, a reverting call tone relay included in said connector switch, said reverting call tone relay having a vibrating reed which alternately charges a condenser and then discharges said condenser over said one line, means actuating said tone relay in response to said selected station answering to discharge said condenser over said line to signal the called subscriber that a reverting call has been answered.

3. In a telephone system, a party line, a plurality of party line substations connected to said party line, a control line and a control relay associated with said party line, each party substation having a different telephone directory number assigned thereto, a switch train including at least one selector switch and a connector switch operated in response to the calling party dialing the directory number of a called party to prepare a connection to the called line of the called party, means for transmitting a busy tone to the calling party in case the calling party is on the same line as the called party, means in said connector switch for selectively signalling the called party, means responsive to the calling party replacing his receiver after hearing the busy tone for releasing part of said switch train including said selector switch; means including said control relay responsive to a signal transmitted over said control line associated with said called line for maintaining said connector switch, for completing the prepared connection to said called line from said connector switch and for operating said signalling means for selectively signalling the called party; and means in said connector switch for feeding talking battery to both the calling and called parties when they answer.

4. In a telephone system, party lines, a control relay and a control line associated with each of said lines, a switch train including a finder-selector link and a connector for extending calls to and from said lines, means responsive to the initiation of a call from a calling line for operating said finder to connect with said calling line, calling subscriber controlled means for operating said selector to connect with said connector, for thereafter directively operating said connector to a called one of said lines and for selecting the signalling current to be applied to said called line in accordance with the directory telephone number of the called party; means in said connector responsive to the calling party replacing his receiver in case the called party is on the same line as the calling subscriber; means including said control relay operated responsive to a signal transmitted over the control line associated with said calling line, upon operation of said last means, for releasing said finder and selector, means in said connector also operated upon the calling party replacing his receiver for maintaining said connector operated, for completing the connection with said called line, and for selectively signalling the called party in accordance with said selected signalling current, and means in said connector for feeding talking battery during conversation to both the calling and called parties on a reverting call.

5. In a telephone system, a party line; a connector switch having access to said line and having a busy relay for transmitting a busy tone to the calling station, a reverting call relay for use in controlling said connector switch to complete reverting calls between stations on said line, and a hold relay for maintaining said connector switch in operated position; means for operating said busy relay in response to a calling station on said line operating said connector switch to connect with said line in making a reverting call to another station on said line, a circuit controlled by said busy relay and completed in response to said calling station hanging up his receiver for energizing said reverting call relay in series with said hold relay, and means controlled by the energization of said reverting call relay for short circuiting said busy relay to cause its release.

6. In a telephone system as claimed in claim 5 including circuit means effective after operation of said reverting call relay for maintaining said reverting call relay and said hold relay energized independent of said circuit and independent of the operative condition of said busy relay.

7. In a telephone system, a party line having a plurality of stations, a connector switch having access to said line to complete calls thereto, a hold relay in said switch operated in response to the seizure of said switch on a call for maintaining said switch in operated position, a reverting call relay in said switch operated in response to one of said stations on said line calling another station on said line for controlling said switch to complete a reverting call including both said calling and called stations on said line, relay means and a circuit energized by said relay means for energizing said reverting call relay and said hold relay in series, and a second circuit for maintaining said reverting call relay and said hold relay energized independent of said relay means and said first mentioned circuit.

8. In a telephone system, a party line; a connector switch having access to said line and having a busy relay for transmitting a busy tone to the calling station, a reverting call relay for use in controlling said connector switch to complete reverting calls between stations on said line, and a hold relay for maintaining said connector switch in operated position; means for operating said busy relay in response to a calling station on said line operating said connector switch to connect with said line in making a reverting call to another station on said line, a circuit controlled by said busy relay and completed in response to said calling station hanging up his receiver for energizing said reverting call relay in series with said hold relay, a second circuit for maintaining said hold relay energized independent of said first mentioned series circuit during the signalling of the called station, said second circuit opened and a third circuit closed in response to said called station answering for maintaining said hold relay in operated position.

PIER BAKKER.

REFERENCES CITED

The following references are of record in the file of this patent:

UNITED STATES PATENTS

| Number | Name | Date |
|---|---|---|
| 1,329,287 | Campbell | Jan. 27, 1920 |
| 1,755,378 | Willis | Apr. 22, 1930 |
| 1,910,972 | Stokely | May 23, 1933 |
| 2,187,186 | Wallace | Jan. 16, 1940 |
| 2,335,473 | Bakker | Nov. 30, 1943 |